United States Patent
Wrate

(10) Patent No.: US 6,202,307 B1
(45) Date of Patent: Mar. 20, 2001

(54) POWER-DRIVEN HAND-HELD TUBING CUTTER

(76) Inventor: Leonard A. Wrate, 386 Encino Dr., Vista, CA (US) 92083

( * ) Notice: Subject to any disclaimer, the term of this patent is extended or adjusted under 35 U.S.C. 154(b) by 0 days.

(21) Appl. No.: 09/027,017

(22) Filed: Feb. 20, 1998

(51) Int. Cl.$^7$ .................................................. B23D 21/08
(52) U.S. Cl. .................................... 30/101; 30/97; 30/102
(58) Field of Search .............................. 30/97, 101, 102; 82/70, 70.2, 72, 113

(56) References Cited

U.S. PATENT DOCUMENTS

| | | | |
|---|---|---|---|
| 2,769,235 | * 11/1956 | Martois | 30/97 |
| 3,370,352 | * 2/1968 | Steely | 30/97 |
| 4,305,205 | * 12/1981 | Girala | 30/102 |
| 4,467,682 | 8/1984 | Huggins | 82/73 |
| 4,802,278 | 2/1989 | Vanderpol et al. | 30/97 |
| 4,890,385 | * 1/1990 | VanderPol et al. | 30/102 |
| 4,953,292 | * 9/1990 | Tobey | 30/97 |
| 5,088,196 | * 2/1992 | Fukuda | 30/102 |
| 5,103,699 | * 4/1992 | Brown | 30/97 |
| 5,528,830 | * 6/1996 | Hansen | 30/97 |

FOREIGN PATENT DOCUMENTS

121131 * 10/1984 (EP) ........................................ 30/101

* cited by examiner

Primary Examiner—Hwei-Siu Payer
(74) Attorney, Agent, or Firm—Brown Martin Haller & McClain LLP

(57) ABSTRACT

A motor driven, hand-held tubing cutter is disclosed, which can be held stationary by a worker while cutting the tubing, and does not require that the tubing be held in a vise or other clamping tool. The device is reversible, and upon completion of the cut, the device can be reset automatically to its initial position to receive a subsequent length of tubing for cutting. The tool has a motor-rotated cutting head into which the tubing to be cut is inserted, one or more cutting blades which are urged into cutting contact with the tubing wall by the motor-driven rotation of the head in cooperation with indexing bosses, and, once the tubing is cut through, reversal of the driving motors causes the blades to be retracted into the head, resetting the tool for further cutting. The tool may be used to cut any cuttable metal or plastic tubings, including tubing of aluminum, brass, copper, steel, ABS, PVC, polycarbonate, phenolic, etc.

7 Claims, 2 Drawing Sheets

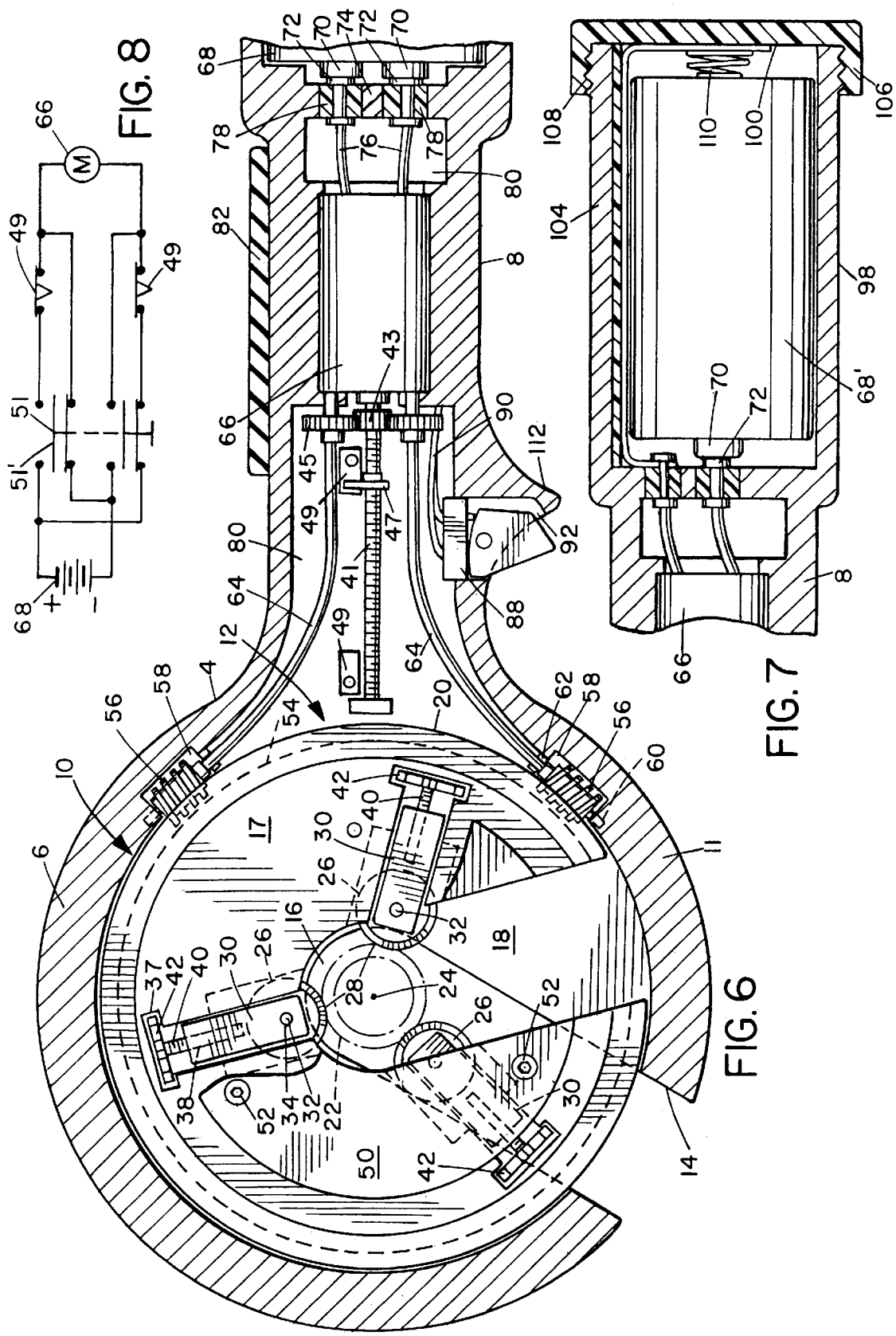

POWER-DRIVEN HAND-HELD TUBING CUTTER

BACKGROUND OF THE INVENTION

1. Field of the Invention

The invention herein relates to construction, building and maintenance tools. More particularly it relates to hand-held tools for cutting metal and plastic tubing.

2. Description of the Prior Art

In building and home construction, maintenance, remodeling and the like, cutting of metal or plastic tubing is a common activity. Such tubing is commonly cut for such uses as electrical conduits, water and steam pipes, and air or gas conduits or vents. For large projects where a substantial amount of tubing of a few standardized lengths is needed, tube cutting is usually performed at a tubing mill or other central location using large cutting machines, which are either free standing or are mounted on work benches or similar bases. Such large volume machine cutting is not related to the present invention.

At the other end of the spectrum, for small projects where a modest number of lengths of tubing are to be cut and where the cut lengths typically vary from piece to piece, a worker commonly cuts each piece of tubing with a small hand-manipulated tubing cutter. Such a cutter is operated simply by repeatedly hand-rotating the entire cutter around a longer, uncut length of tubing at the desired cut point, with the cutter blades being hand-moved inwardly in incremental steps after each rotation, so that eventually the blades cut through the tubing. Such hand work, while slow, usually involves few cutting operations which are simple and often performed at widely separated times, so that there is little incentive for the use of more complex cutting tools.

There are many intermediate sized jobs, however, such as construction or remodeling of individual houses, addition of rooms or wings to existing houses, or extension of electrical, water or gas lines into patios, gardens, walkways or other areas immediately surrounding an individual house or building, where a substantial amount of tubing must be cut, often to different lengths and at frequent time intervals. However, such jobs usually do not have the few standard lengths to justify mill cutting or a large enough volume of tubing to justify placement on-site of a cutting machine. In addition, such jobs sites are often at remote or unique locations, so that it is not economic to transport the machine to the job site or to modify the job site to accommodate the machine. In the past, tubing cutting on such intermediate sized jobs has therefore been done by a worker using a conventional hand-manipulated tubing cutter as described above, and making the cuts by the same repeated rotations and blade indexing steps used for the small jobs. For an intermediate sized job, such tasks are tedious, require a significant length of time for each cut of be completed, (particularly for larger diameter or thicker walled tubing) and can cause excessive fatigue of the worker's hands, wrists and arms, and may ultimately results in "repetitive stress" injuries to the worker.

SUMMARY OF THE INVENTION

I have now invented a motor driven, hand-held tubing cutter which can be easily operated by a worker to make tubing cuts cleanly and quickly. The device is held generally stationary, and the cutting head is driven by the motor around the tubing to make the cut. The motor is reversible, so that once the cut is made, the motor is reversed (preferably automatically) to return the cutting head and blades to their initial position, so that the tool is reset to receive a subsequent length of tubing for the next cut. The worker does not have to manually rotate the cutter around the tubing, thus essentially eliminating significant strain on his or her hands, wrists or forearms. Numerous pieces of tubing can be easily cut in a short time period without causing any significant fatigue to the worker. The device is sufficiently simple that it can be readily operated in a safe and effective manner not only by trained construction, electrical, plumbing, etc. workers, but also by competent laymen such as "do-it-yourself" homeowners.

In addition, the tool has the distinct advantage that it can be use to cut tubing cleanly and quickly without requiring that the tubing be held in a vise or other clamping tool. In fact, in many cases a worker will be able to hold a length of tubing in one hand and the cutter of this invention in the other hand, and cut the tubing cleanly without requiring any kind of other support for the tubing at all.

Briefly, the tool of this invention has a frame in which is disposed a motor-rotated cutting head into which the tubing to be cut is inserted, one or more cutting blades which are indexedly urged into cutting contact with the tubing wall by the motor-driven rotation of the head, and, once the tubing is cut through, reversal of the driving motors causes the blades to be retracted into the head, resetting the tool for further cutting.

The tool may be used to cut any cuttable metal or plastic tubing, including tubing of aluminum, brass, copper, steel, ABS, PVC, polycarbonate, phenolic, etc. Different diameters of tubing can be accommodated by a single cutter, or preferably there can be a set of cutters of different sizes, so that the cutter of the most appropriate size can be selected for cutting tubing of a particular diameter.

Thus, in a preferred broad embodiment, the invention herein is of a powered hand-held tubing cutter which comprises a frame; a motor mounted on said frame for rotating a cutting head; and a cutting head within said frame and rotatable by said motor, having a central aperture for receiving a length of tubing disposed coaxially of the cutting head, a recess extending radially from said aperture, and cutting means for cutting said tubing disposed in and moveable along said recess and comprising a rotatable cutting blade with a cutting edge capable of being disposed into said aperture; and indexing means cooperating with said cutting means for indexing said cutting means along said recess as said cutting head is rotated by said motor; whereby as said motor rotates said cutting head, said cutting means is moved inwardly along said recess by said indexing means, such that as said cutting blade rotates around said tubing, said cutting edge cuts into said tubing, and each rotation of said cutting head causes said cutting means to move further inwardly and said cutting blade to cut deeper into said tubing.

In another embodiment the invention also involves a cutting head for a hand-held tubing cutter powered by a motor, which comprises: a circular plate having a central aperture for receiving a length of tubing disposed coaxially of said plate; a recess in said plate extending radially from said aperture; cutting means for cutting said tubing disposed in and moveable along said recess and comprising a rotatable cutting blade with a cutting edge capable of being disposed into said aperture; rotation means for cooperation with said motor such that operation of said motor rotates said circular plate; and indexing means cooperating with said cutting means for indexing said cutting means along said recess as said circular plate is rotated by said motor.

Other embodiments and details will be evident from the description below, taken in conjunction with the appended drawings.

BRIEF DESCRIPTION OF THE DRAWINGS

FIG. 6 is a cross-sectional plan view taken on Line 6—6 of FIG. 3, further illustrating (in phantom cross-section) a length of tubing which is being cut by the device;

FIG. 7 is an alternative detail view of a portion of the handle of a cutter otherwise similar to that of FIG. 1, but illustrating an embodiment having a chamber for an enclosed battery; and FIG. 8 is a schematic diagram illustrating an electrical circuit for reversal of the motor.

DETAILED DESCRIPTION AND PREFERRED EMBODIMENTS

Figure 1:
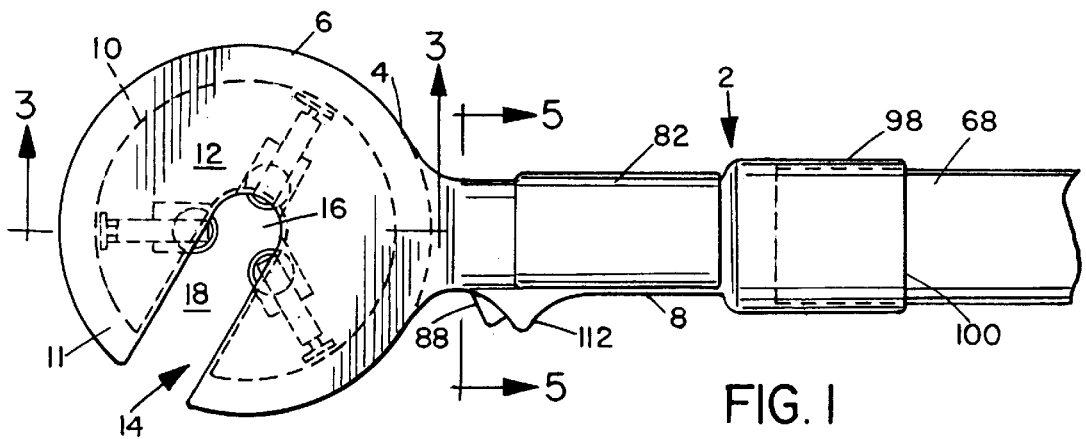
FIG. 1 is a side elevation view of a powered tubing cutter of the present invention, shown in a typical operating position in which a horizontally disposed length of tubing would be received within the tool, and in an embodiment having a "plug-in" battery.
Figure 2:
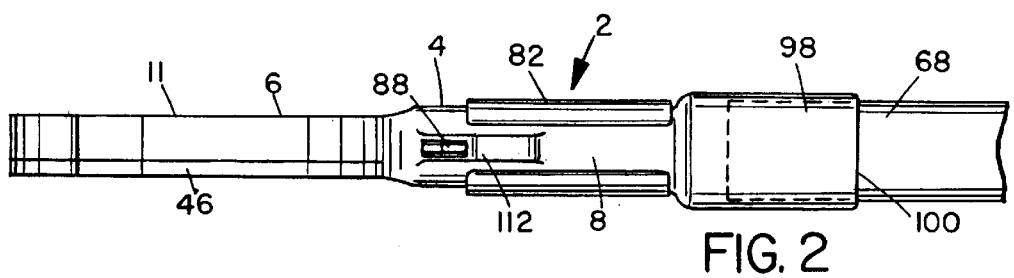
FIG. 2 is a bottom plan view of the cutter of FIG. 1.

The tool of the present invention is best understood by reference to the drawings. A principal embodiment of the tubing cutter 2 is shown in a side view in FIG. 1 and a bottom view in FIG. 2. For ease of description in this specification, the designations "side," "bottom," etc, will be defined by the usual orientation in which a worker would hold the tool to operate it while cutting tubing supported in a horizontal postiion, as on sawhorses or a tubing rack. It is, however, to be understood that a length of tubing can be cut by the tool regardless of the particular orientation of the tubing (e.g., vertical, on a slant, etc.), so that this description is not to be considered limiting, but rather to be applicable to all uses of the tool regardless of its orientation or that of the tubing to be cut on a particular job.

The tool or device 2 consists of a frame 4 which has a generally circular cutting portion 6 at one end which merges into an elongated handle 8 extending to the other end. In the cutting portion 6 the frame 4 is configured with a central circular recess 10 having a peripheral wall 11 and a floor 13, in which the circular cutting head 12 is seated. (Floor 13 extends to form the housing for the remainder of the device, with the exception of the portion closed by cover plate 46.) The cutting head 12 will be described in more detail below. A channel 14 passes through the wall 11 and extends into a central area of the recess 10, and corresponds with a similar channel 18 leading into corresponding central area of the cutting head 12 (the overall central area through the device being designated 16). Channels 14 and 18 provide access for the tubing to be moved into the tool and their common width defines the capacity of the cutter, i.e., the largest diameter of tubing which can be used with that cutter. It is contemplated that there can be a number of cutters of different capacities to cover the broad range of tubing sizes. For instance, a typcial set might include cutters having capacities respectively of ¼"–1", 1"–2", etc. (or generally corresponding metric widths such as 6–25 mm, 25–50 mm, etc.). Such dimensions and capacities are, of course, a matter of choice and do not limit the present invention.

While the recess 10 will have a circular profile to accommodate the rotation of the cutting head 12, the external profile of the cutting portion 6 and the exterior of wall 11 may be circular, square, hexagonal, octagonal, or other convenient shape. However, a circular external profile, providing a uniform thickness of wall 11 as shown in the drawings, is preferred as being easy and economical to manufacture.

FIG. 6 illustrates the structure and operation of the cutting head 12. The central area 16 is the interior end of the channel 18, which in turn extends to the peripheral edge 20 of the cutting head 12. As mentioned above, since the widths of channels 14 and 18 are the same, when the channels 14 and 18 are aligned, tubing 22 to be cut can be moved directly into the central area 16, be positioned coaxailly with the central axis 24 of the cutting head 12, and there be engaged by the cutting blades 26 (illustrated as the preferred equally-spaced three blade set). Each cutting blade 26 has a sharpened peripheral cutting edge 28 which is normally unserrated, of the type conventionally used to cut metal or plastic tubing. Each blade 26 rotates on a central axle 32 which is journaled in a pair of holes 34 in a traveling block 30 so that the blade 26 turns freely as it moves around the tubing 22 and progressively cuts into and through the tubing wall, and also so that the cutting blade 26 can be fully retracted into the head 12 and out of the central area 16.

Figure 3:
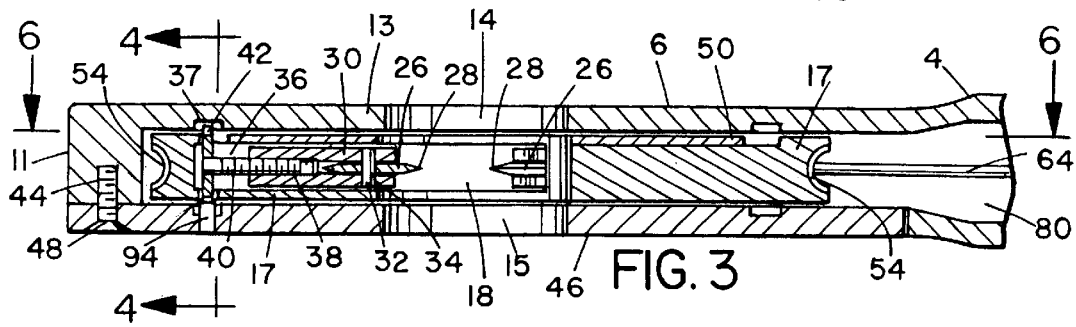
FIG. 3 is a cross-sectional elevation view taken on Line 3—3 of FIG. 1.
Figure 4:
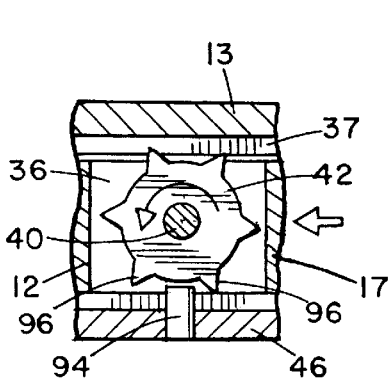
FIG. 4 is a cross-sectional elevation detail view taken on Line 4—4 of FIG. 3.
Figure 5:
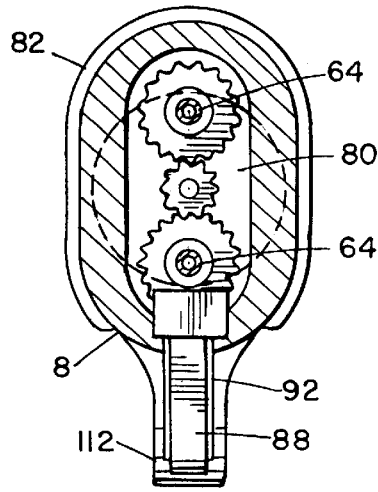
FIG. 5 is a cross-sectional elevation view taken on Line 5—5 of FIG. 1.

Each traveling block 30 is disposed in a recess 36 which is formed in circular plate 17 forming the body of cutting head 12. Each traveling block 30 has a threaded hole or socket 38 formed in the end opposite the end on which the cutting blade 26 is mounted. Threaded into each hole 38 is a mating screw 40 to which is fixed a toothed wheel 42. Toothed wheel 42 projects slightly out of the top and bottom surface of the circular plate 17 as best seen in FIGS. 3 and 4. The mating threads of screw 40 and hole 38 are such that as the toothed wheel 42 turns, screw 40 rotates simultaneously with it and the cooperating action of the mated threads causes the traveling block 30 to move inwardly toward the central axis 24 or retract away from it, depending on the direction of rotation of the toothed wheel 42.

The frame 6 is formed with the side opposite floor 13 open and the top of wall 11 is drilled and tapped at appropriate spots around its length to form threaded sockets 44. A cover plate 46 fits over the open side of the portion 6 and is secured in place by machine screws 48 threaded into sockets 44. The cover 46 will have a cut-out portion 15 aligned and coextensive with slot 14, channel 18 and aperture 16 to accommodate the insertion of the tubing 22 into the tool. A smaller diameter cover plate 50 is fitted over circular plate 17 and is attached thereto by machine screws 52 to provide access to recesses 36, cutting blades 26 and traveling blocks 30 for repair, replacement, cleaning, lubrication or maintenance.

Incorporated into the peripheral edge 20 of the circular plate 17 is a continuous worm gear 54. Worm gear 54 meshes with one or more worms 56 which are positioned in recesses 58 formed in the wall 11 of the frame, with their axial shafts journaled in sockets 60 and 62 to ensure proper meshing of the worms 56 with the worm gear 54. Each worm 56 is driven by a flexible shaft 64 which, in turn, is driven by a motor 66 seated inside the handle 8 of frame 4. The motor 66 is powered by a battery 68 or 68' which is housed in end portion 98 of handle 8. Electrical connections from the battery 68 or 68' to the motor 66 is through one or more terminals 70 on the battery in contact with corresponding terminals 72 mounted on a crosswall 74 within handle 8. Wires 76 pass through the crosspiece 74 inside grommets 78 and attach to motor 66. A generally C-shaped flexible cover 82 (FIGS. 1, 2 and 6) can be opened and removed for access to the motors 66.

Open space 80 is provided within the housing to accommodate the driving and reversing mechanism of the device. The motor 66 has a central threaded drive shaft 41 which has mounted thereon a gear 43. Gear 43 is meshed with two drive gears 45, each of which rotates one of the flexible shafts 64 to which the worms 56 are connected. As the motor shaft 41 turns, it thus drives the worms 56 through the gears 43 and 45 and the shafts 64. Also mounted on threaded shaft 41 is a movable contact 47 which traverses along shaft 41 as the shaft rotates and the tubing is cut. At opposite ends of the shaft the contact 47 engages one or the other of limit switches 49. The alternate opening and subsequently closing of limit switches 49, in combination with relay 51 in the circuit of FIG. 8, causes reversal of motor 66, thus causing the worms 56 to reverse and return the cutting head to its initial position and retract the cutting blades, to reset the device for receipt of the next length of tubing to be cut. Alternatively, the device could include a manual reversing switch desiganted 51', which would allow the motor 66 to be reversed without a limit switch 49 being tripped. The manual switch could also be a "normally reversed" switch, so that the operator would have to keep a finger or thumb on the switch to cause the motor to be run in the forward direction and cause the cutter to operate to cut the tubing, and release of that finger or thumb contact would cause the switch to revert to the reversed position, reverse the motor direction, and cause the cutting head and blades to return automatically to the reset position.

The motor 66 is controlled by an off/on switch 88 set in an opening 92 in frame 4, and which is normally a simple SPST toggle switch placed in wires 90, and which operates to open or close the battery/motor circuit. Alternatively, switch 88 may be a sliding or rotating potentiometer or resistance coil which regulates to power to the motors and thus provides for variable speed of the motor 66 as well as a complete cutoff of power. This permits the user to control the rotational speed of the cutting head 12.

In FIG. 6, two worms 56 and flexible shafts 64 are shown. This configuration insures that the cutting head 12 will continue to rotate smoothly driven by a worm 56 even while the channel 18 is traversing past the other worm 56. In this configuration, the channel 18 has a width equal to or greater than the length of a worm 56 so that during the traverse, the worm 56 adjacent to channel 18 is inoperative and the rotational driving force needed by the cutting head 12 is supplied entirely by the opposite worm 56 which remains in meshed contact with the worm gear 54. Alternatively, a cutter of the present type could be formed without a channel 18 (by simply having a central aperture into which the tubing would have to be moved by passing it through longitudinally until the point of cutting was reached) or a channel which had a width substantially less than the length of a worm 56. In that case, it would be possible to run the device with only a single worm 56 since at least some operative portion of worm 56 would always be in meshed contact with the peripheral worm gear 54. In addition, a single worm and shaft could also be used where the tool is intended to make a complete cut in a length of tubing in less than one full rotation of the head 12, with the single worm 56 place such that the channel 18 does not reach it during the head's partial rotation. Such complete cuts are possible with any embodiment of the present device in which there are a plurality of cutting blades 26.

Referring again to FIGS. 3 and 4, the operation of the toothed wheels 42 and their indexing of movement of the traveling blocks 30 is illustrated. Mounted on the floor 13 or the cover 46 is a boss 94 which projects upward through circular groove 37 in which the toothed wheel moves, so that as the cutting head 12 rotates, on each rotation a successive tooth 96 of the wheel 42 encounters the boss 94, causing the wheel to be indexed one unit of rotation, thus causing the screw 40 to turn the same amount and move the traveling block 30 a distance dependent upon the pitch of the mating threads between screw 40 and socket 38. The degree of rotation of a "unit" for each encounter of the toothed wheel 42 with the boss 94 is determined by the number of teeth 96 around the circumference of the wheel 42. In the embodiment shown there are six teeth, so a unit would be one-sixth of a rotation, or 60° rotation of the wheel 42 for each 360° complete rotation of the cutting head 12.

If there is only a single boss 94 in the device, a particular cutting blade 26 and its cutting edge 28 will remain at the same position with respect to the tubing 22 for an entire complete rotation of the cutting head 12, thus ensuring that the groove cut into the wall of the tubing will be of uniform depth for that particular cutting blade. However, but having a number of bosses positioned around the recess 10, each toothed wheel 42 will encounter the successive bosses 94 during rotation of the cutting head 12 and each blade 26 will be indexed forward at each encounter, so the blades 26 will cut progressively deeper into the groove being formed in the tubing and thus speeding the full cut of the tubing.

The batteries 68 and 68' are housed in the terminal end 98 of handle 8. In the embodiment shown in FIGS. 1–6, the terminal end portion 98 is open at the end 100 and contains a socket or receptacle 102 sized to provide a slight interference fit for a removable rechargeable battery 68. Such batteries are commonly used with many industrial and construction tools such as cut off saws, drills, etc. This type of rechargeable battery will be equally suitable for this tool with the receptacle or socket 102 being configured to accept such batteries. A worker can use the device until the battery 68 becomes discharged and then simply remove the battery 68, replace it with a fully charged battery 68, and continue to work. The discharged battery will normally be put into a charging device (not shown) of the type which is widely available commercially for recharging of such batteries.

In the embodiment of FIG. 7, the battery 68' serves the same function as the battery 68, but is a battery which is wholly contained within chamber 104 formed in the terminal portion 98 of the handle 8. In this case, the end 100 of the end portion 98 is closed by screw cap 106 which is threadedly fitted onto the end portion 98 by matching threads 108. Preferably a compression spring 110 is secured to the inner surface of cap 106 to urge the battery 68' into firm contact between terminals 70 and 72 to secure good electrical conduction. Battery 68' may be rechargeable or non-rechargeable as desired. When the battery 68' becomes discharged, cap 106 is unscrewed and the battery is removed and replaced by a new battery 68'. The old battery may be either recharged or discarded as appropriate.

The tool of the present invention may be used to cut any conventional type of metal or plastic tubing, conduit, pipe or similar product. The tubing may be made of any cuttable metal or plastic, including but not limited to metals such as aluminum, brass, copper or thin gauge steel and plastics or polymers such as ABS, PVC, polycarbonate, phenoic, etc. The type of cutting blades and blade edge profile may be dependent upon the type of material of which the tubing is made and the tubing wall thickness, and will normally be selected in the same manner as selection of the cutting blades for the prior art high capacity cutting machines or for the hand-manipulated cutting devices previously commercially available.

While the handle 8 of the device illustrated is shown as generally linear in profile, it is evident that it could be configured with external recesses or protrusions designed to conform to the worker's hand comfortably. A useful protrusion is the projection 112 behind switch 88, intended to provide the worker's hand purchase to facilitate operation of switch 88.

It will be evident from the description above that the tool of the present invention can quickly and easily cut many different types of tubing and can be used repetitively by a worker with little or no fatigue, since the device merely needs to be supported by the worker's hand and does not need to be manipulated to cause it to rotate around the tubing. In this device the motor drives the cutting head around the tubing and the cooperating toothed wheels and one or more bosses cause the cutting blade to progressively cut deeper into the tubing wall with each rotation until the tubing wall is completely cut through and the desired length of tubing is severed from the overall length of workpiece. Reversal of the motor's rotation (either manually or automatically) provides retraction of the blades 26 into the channels 14,18 again without effort by the worker.

It will be evident that there are numerous embodiments of the present invention which, while not expressly described above, are clearly within the scope and spirit of the invention. The above description is therefore to be considered exemplary only, and the scope of the invention is to be determined solely by the appended claims.

I claim:

1. A portable powered hand-held tubing cutter which comprises:
    a portable frame comprising a first portion enclosing and retaining a cutting head and an elongated second portion extending from said first portion and forming a handle;
    a motor mounted within said frame for rotating a cutting head;
    a battery having an electrical connection with said motor to power said motor;
    said cutting head being within said frame and rotatable by said motor, having a central aperture for receiving a length of tubing disposed coaxially of the cutting head, a recess extending radially from said aperture, and cutting means for cutting said tubing disposed in and moveable along said recess and comprising a rotatable cutting blade with a cutting edge capable of being disposed into said aperture;
    indexing means cooperating with said cutting means for indexing said cutting means along said recess as said cutting head is rotated by said motor;
    said motor being reversible, such that rotation of said cutting head by said motor in one direction causes said indexing means to move said cutting blade radially inwardly of said cutting head and upon reversal rotation of said cutting head by said motor in an opposite direction causes said indexing means to move said cutting blade radially outwardly of said cutting head; and
    whereby as said motor rotates said cutting head and said cutting means moves inwardly along said recess by said indexing means, said cutting blade rotates around said tubing, said cutting edge cuts into said tubing and each rotation of said cutting head causes said cutting means to move further inwardly and said cutting blade to cut deeper into said tubing.

2. A tubing cutter as in claim 1 further comprising reversing means for selectively controlling the direction of rotation of said cutting head.

3. A tubing cutter as in claim 2 wherein said reversing means automatically reverses the direction of said motor when a tubing cut is complete, such that the cutting means are returned to a position in which an uncut length of tubing can be received for cutting.

4. A portable powered hand-held tubing cutter which comprises:
    a portable frame comprising a first portion enclosing and retaining a cutting head and an elongated second portion extending from said first portion and forming a handle;
    a motor mounted within said frame for rotating a cutting head;
    a battery having an electrical connection with said motor to power said motor;
    said cutting head being within said frame and rotatable by said motor, having a central aperture for receiving a length of tubing disposed coaxially of the cutting head, a recess extending radially from said aperture, and cutting means for cutting said tubing disposed in and moveable along said recess and comprising a rotatable cutting blade with a cutting edge capable of being disposed into said aperture, said cutting blade being rotatably mounted on a traveling block; and
    indexing means cooperating with said cutting means for indexing said cutting means along said recess as said cutting head is rotated by said motor, said indexing means comprising
        said block having a threaded hole which receives and cooperates with a mating screw,
        said screw extending out of said hole and terminating in a coaxial peripherally toothed wheel, with said toothed wheel extending out of said cutting head, and
        a stationary boss on an interior of said frame and aligned with said toothed wheel;
    such that as said cutting head rotates, said toothed wheel engages said boss once during each rotation of said cutting head, and said engagement causes said toothed wheel to index one step, turning said screw and causing said block mated with said screw and said mounted cutting blade to move axially within said recess, said cutting blade rotates around said tubing and said cutting edge cuts into said tubing, and each rotation of said cutting head causes said cutting means to move further inwardly and said cutting blade to cut deeper into said tubing.

5. A cutting head for a hand-held tubing cutter powered by a motor, which comprises:
    a circular plate having a central aperture for receiving a length of tubing disposed coaxially of said plate;
    a recess in said plate extending radially from said aperture
    cutting means for cutting said tubing disposed in and moveable along said recess and comprising a rotatable cutting blade with a cutting edge capable of being disposed into said aperture;
    rotation means for cooperation with said motor such that operation of said motor rotates said circular plate; and indexing means cooperating with said cutting means for indexing said cutting means along said recess as said circular plate is rotated by said motor;

said motor being reversible such that rotation of said circular plate by said motor in one direction causes said indexing means to move said cutting blade radially inwardly of said circular plate and upon reversal of said motor rotation of said circular plate by said motor in an opposite direction causes said indexing means to move said cutting blade radially outwardly of said circular plate.

6. A cutting head as in claim 5 wherein said cutting blade is rotationally mounted on a traveling block, and said indexing means comprises said block having a threaded hole which receives and cooperates with a mating screw, and said screw extends out of said hole and terminates in a coaxial peripherally toothed wheel, with said toothed wheel extending out of said cutting head for intermittent contact with a stationary boss on said tubing cutter, such that as said cutting head rotates, said toothed wheel engages said boss once during each rotation of said cutting head, and said engagement causes said toothed wheel to index one step, turning said screw and causing said block mated with said screw and said mounted cutting blade to move axially within said recess.

7. A cutting head as in claim 5 wherein said central aperture in said circular plate comprises a terminal end of an open channel extending from said central aperture to the periphery of said plate, such that said tubing can be passed through said channel for disposition within said central aperture.

* * * * *